United States Patent [19]

de Caussin

[11] Patent Number: 5,205,686
[45] Date of Patent: Apr. 27, 1993

[54] APPARATUS AND METHOD FOR HYDRAULICALLY FED CUTTINGS REMOVAL AND COLLECTION FOR CUTTING TYPE MACHINE TOOLS

[75] Inventor: Rodney A. de Caussin, Northridge, Calif.

[73] Assignee: Fadal Engineering Co., North Hollywood, Calif.

[21] Appl. No.: 832,377

[22] Filed: Feb. 7, 1992

[51] Int. Cl.[5] .......................................... B23Q 11/00
[52] U.S. Cl. ............................ 409/131; 29/DIG. 94; 29/DIG. 102; 82/901; 408/1 R; 408/67; 409/137
[58] Field of Search ................. 408/1 R, 67; 409/131, 409/137; 82/901; 29/DIG. 94, DIG. 98, DIG. 102; 241/DIG. 31

[56] References Cited

U.S. PATENT DOCUMENTS

| | | | |
|---|---|---|---|
| 427,869 | 5/1890 | Hurlbut | 82/152 |
| 1,616,151 | 2/1927 | Thacher | 82/149 |
| 3,931,935 | 1/1976 | Holman | 241/DIG. 31 |
| 4,052,013 | 10/1977 | Ehrlich et al. | 241/DIG. 31 |
| 4,134,556 | 1/1979 | Ehrlich et al. | 241/DIG. 31 |
| 4,684,070 | 8/1987 | Dicky | 241/DIG. 31 |
| 4,955,770 | 9/1990 | Kitamura | 409/134 |
| 5,078,256 | 1/1992 | Hatano et al. | 409/137 |

Primary Examiner—Daniel W. Howell
Attorney, Agent, or Firm—Blakely, Sokoloff, Taylor & Zafman

[57] ABSTRACT

An apparatus and method for the hydraulic removal and collection of cuttings from machine tool systems. The present invention provides a cutting removal and collection system comprising a housing at least partially enclosing a machine tool and a plurality of trays at the bottom of the housing for collecting the cuttings as they fall from the machine tool. Jets of fluid, such as a liquid coolant, are used to direct the cuttings along the trays and into a rotating drum. The drum has a hollow annular structure with fins disposed in an axial direction along its interior. The drum also has a perforated surface for allowing drainage of the fluid off of said cuttings and back into a tank positioned below the rotating drum. As the drum rotates, the fins carry the cuttings in the circumferential direction of rotation. Once the cuttings are carried to a certain height, gravity causes the cuttings to fall onto a drop tray positioned along a horizontal chord of the rotating drum. The cuttings then slide off or are pushed off the drop tray into a collection drum.

26 Claims, 4 Drawing Sheets

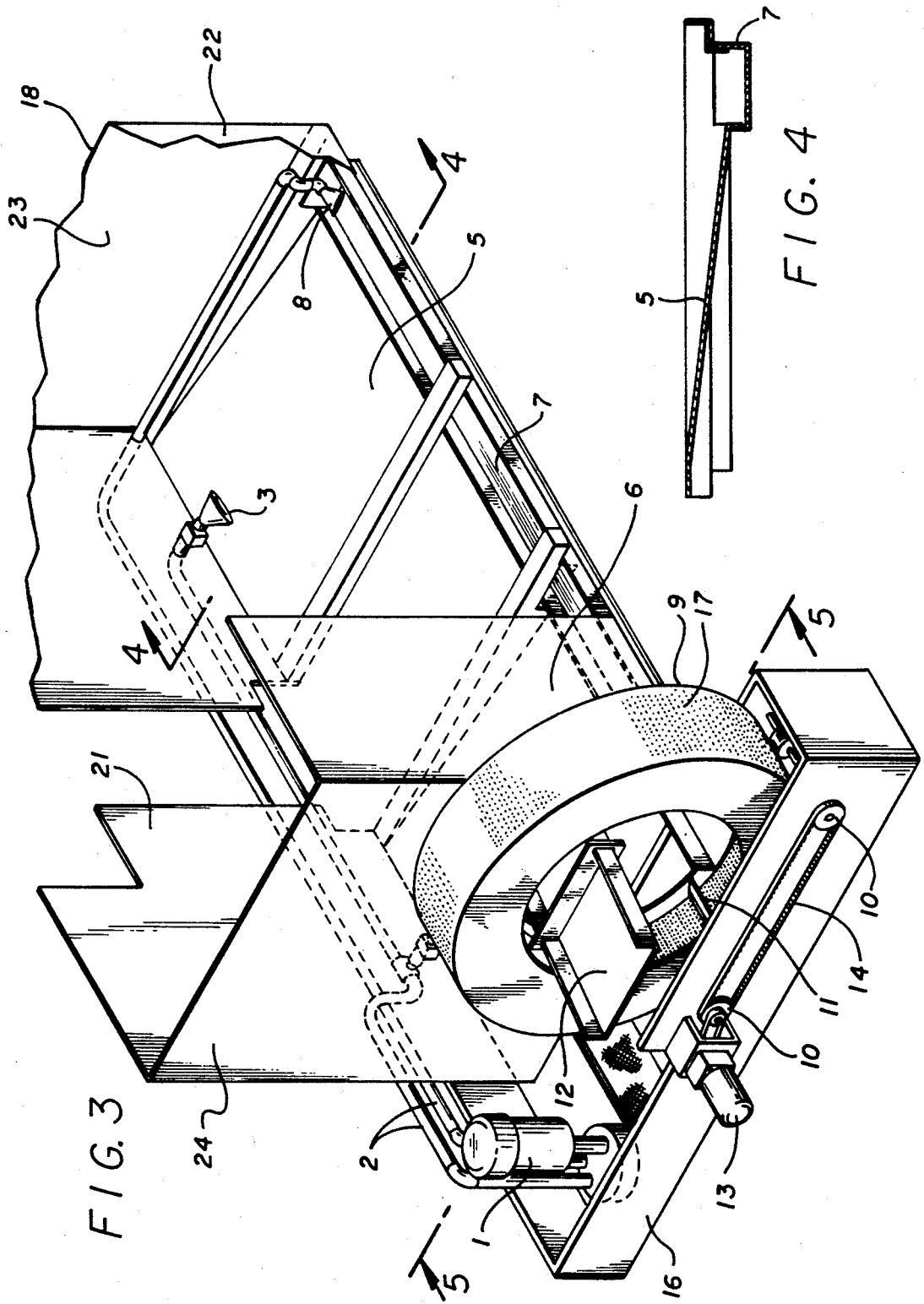

APPARATUS AND METHOD FOR HYDRAULICALLY FED CUTTINGS REMOVAL AND COLLECTION FOR CUTTING TYPE MACHINE TOOLS

BACKGROUND OF THE INVENTION

1. Field of the Invention

The present invention relates to an apparatus and method for hydraulically removing and collecting cuttings from a cutting type machine tool.

2. Description of the Related Art

The operation of a machine tool inevitably leads to the production of cuttings from the material being machined. As a waste byproduct of the machining process, the cuttings must be removed from the area of the machine tool in order to prevent a buildup of cuttings which may hinder machine tool operation. Moreover, the cuttings become mixed with liquid coolant or lubricating oil used in the machine tool. In order not to waste the coolant or oil, it is desirable to separate out the cuttings so that the coolant or oil may be recycled.

As a first step in this disposal and separation process, the cuttings typically are collected in an area below the machine tool. In conventional systems, a perforated receptacle or tray may be positioned in this area to allow the liquid coolant or oil to drain off of the cuttings. See Hurlbut, U.S. Pat. No. 427,869 and Kitamura, U.S. Pat. No. 4,955,770. See also Thacher, U.S. Pat. No. 1,616,151.

In prior art systems, the cuttings are removed in a number of ways. The cuttings may be removed manually, e.g., by shoveling the cuttings from the cuttings tray. Another common method utilizes an auger to push the cuttings out of the trays. Alternatively, the chip conveyor method uses a steel belt instead of a cuttings tray or a collection receptacle. Cuttings fall onto the belt and are transported to a collection container. See Lopez, U.S. Pat. No. 4,679,295. The conveyor itself may be composed of a belt-like filter net material to allow the oil or coolant to drain off the cuttings into a collection pan. See Kitamura, U.S. Pat. No. 4,955,770.

In one conventional system, the chip conveyor apparatus has been combined with a drum in order to separate the cuttings from the coolant. See the Kleenall Chip Filter manufactured by Barnes International, Inc. In that apparatus, a conveyor consisting of a series of chain-driven angle bars is partially immersed in dirty coolant. Heavy chips at the bottom of the coolant tank are raked up an inclined side of the tank and through an exit hole by the moving angle bars. Meanwhile, coolant is filtered through a continuously turning drum, also partially immersed in the dirty coolant, which is rotated by the same chain that drives the conveyor. Small chips that were not removed by the conveyor are trapped in the nylon mesh surface of the drum. As the drum rotates, spray nozzles inside the drum continuously backwash the mesh material with coolant in order to dislodge the particles from the mesh surface. These particles accumulate and are carried away by the conveyor. Once filtered, the clean coolant passes out of the interior of the drum through an exit port.

These conventional methods present a number of disadvantages. First, the manual removal of cuttings is expensive because it is highly labor intensive. Second, the auger system is inefficient because it is subject to frequent jamming and because many cuttings do not fall within the range of the auger so that they may be pushed out of the cuttings trays.

Third, the chip conveyor system does not adequately separate the cuttings from the coolant. In theory, the conveyor belt transports the cuttings out from under the machine tool to a collection container as the cuttings fall off the belt. However, in practice, a large number of cuttings fall outside of the area of the conveying surface. Moreover, many cuttings typically do not fall off the belt but are instead transported back on the return travel of the belt during which the cuttings may fall off into the oil or coolant collection pan and again mix in with the oil or coolant. Moreover, the chip conveyor system is expensive to manufacture and utilizes many moving parts, thus requiring expensive maintenance.

Fourth, the combined drum/conveyor system is similarly complex and expensive to manufacture. The drum/conveyor apparatus unnecessarily requires separate components, i.e., the conveyor and the drum, to separate heavy cuttings and finer cuttings, respectively, from the coolant. As discussed below, the present invention avoids this degree of complexity, while providing superior separation of the cuttings from the coolant.

SUMMARY OF THE INVENTION

The present invention is an apparatus and method for the hydraulic removal and collection of cuttings from machine tool systems. The present invention overcomes the limitations and disadvantages associated with conventional methods of cuttings removal and collection.

An object of the present invention is to provide a cuttings removal and collection system which is cheaper to manufacture, easier to maintain and which requires fewer moving parts than prior systems. A further object of the invention is to provide a cutting removal and collection system which allows for better separation of the cuttings from the coolant or lubricating oil.

Accordingly, the present invention provides a cuttings removal and collection system comprising a housing that at least partially encloses a machine tool, and a plurality of trays at the bottom of the housing for collecting the cuttings as they fall from the machine tool. Jets of liquid coolant are used to direct the cuttings along the trays and into a rotating drum.

The drum has a hollow annular structure with fins disposed in an axial direction along its interior. The drum also has a perforated surface for allowing drainage of the coolant off of the cuttings and back into a coolant tank positioned below the rotating drum.

As the drum rotates, the fins carry the cuttings in the circumferential direction of rotation. Once the cuttings are carried to a certain height, gravity causes the cuttings to fall onto a drop tray positioned along a horizontal chord of the rotating drum. The cuttings then slide off the drop tray or are pushed by a moving blade into a collection drum.

Note that an advantage of the invention is that all of the cuttings are collected and removed because they all fall inside the drum. This feature avoids the problem inherent in conventional conveyor systems wherein many cuttings fall outside of the conveyor belt area and back into the tank.

BRIEF DESCRIPTION OF THE DRAWING

FIG. 3 is a sectional perspective view of the embodiment of FIG. 1.

FIG. 4 is a sectional view of a cuttings tray taken through line 4—4 of FIG. 3.

DETAILED DESCRIPTION OF THE INVENTION

The present invention will be described in accordance with a preferred embodiment. One of ordinary skill in the art will realize that the present invention is not limited to the preferred embodiment. For instance, the components of the hydraulic removal and collection apparatus described below may be rearranged into different positions, yet still achieve the objects of the present invention.

Figure 1:
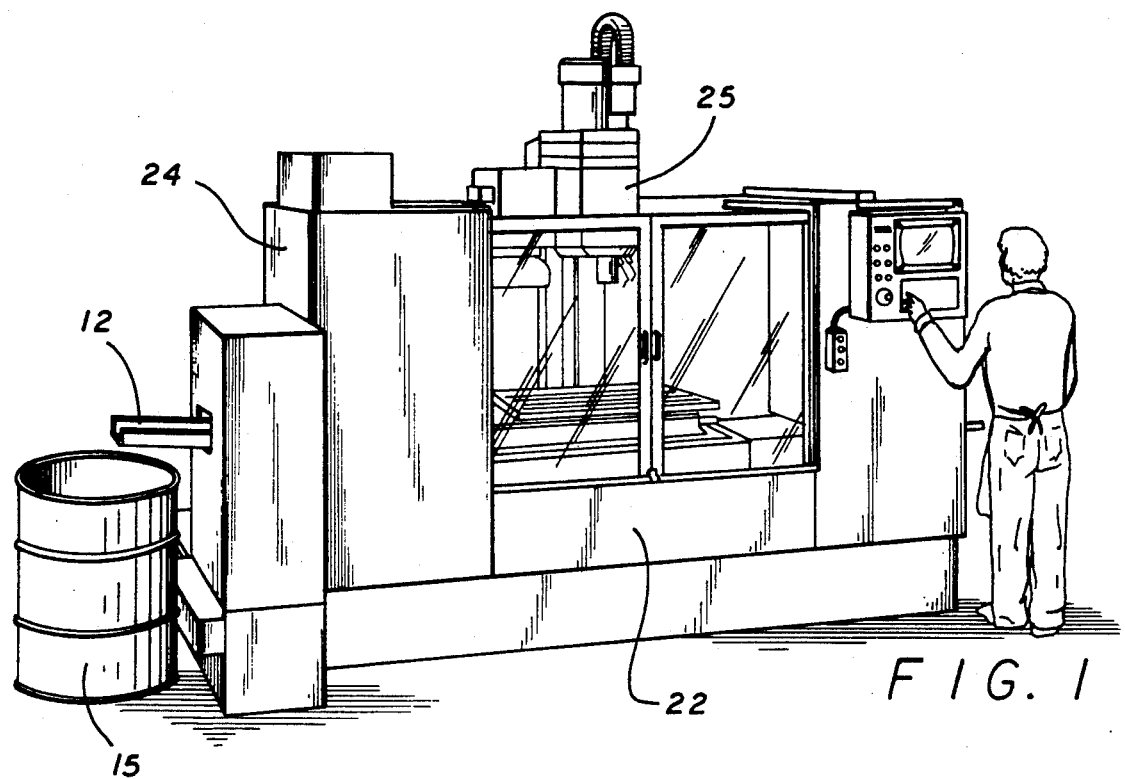
FIG. 1 is a perspective view taken from the front of a preferred embodiment of the hydraulically fed cuttings removal and collection apparatus of the present invention, shown here with a milling machine.
Figure 2:
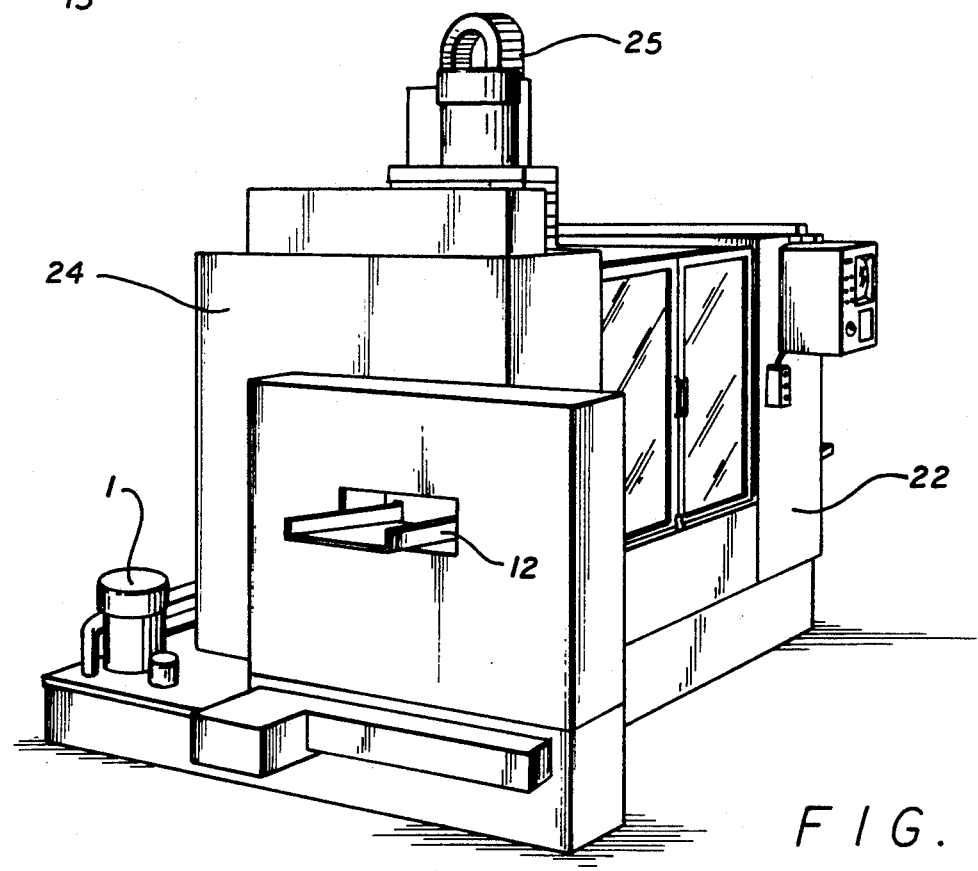
FIG. 2 is a perspective view of an end of the embodiment of FIG. 1.

FIGS. 1 and 2 illustrate an embodiment of the present invention used in conjunction with a machine tool 25, such as a vertical milling machine.

Figure 5:
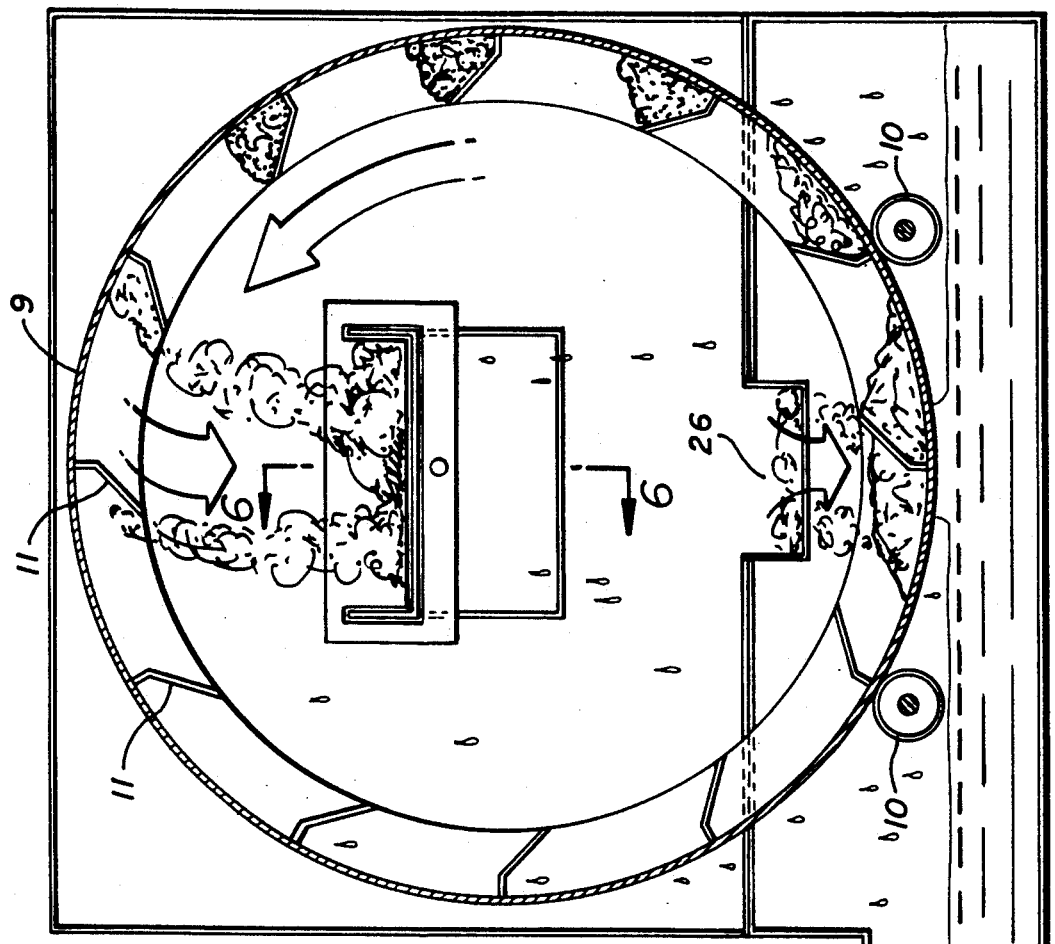
FIG. 5 is a sectional end view taken through line 5—5 of FIG. 3.

FIG. 3 is a detailed perspective view of the embodiment shown in FIGS. 1 and 2. The machine tool 25 shown in FIGS. 1 and 2 is positioned above the cuttings trays 5 and 6 which lie at the bottom of the housing 18. As shown in FIGS. 3 and 4, the cuttings trays 5 and 6 are angled at an incline sloping downward from a first side 21 of a housing 18 towards cross-tray 7, which runs along a second side 22 of the housing 18 opposite said first side 21 and transverse to the cuttings trays 5 and 6. Cross-tray 7 is also positioned at a height lower than the cuttings trays, and runs from a third side 23 of the housing 18 towards a fourth side 24 of the housing. Cross-tray 7 exits the housing through an opening 26 in the fourth side as indicated in FIG. 5.

Figure 7:
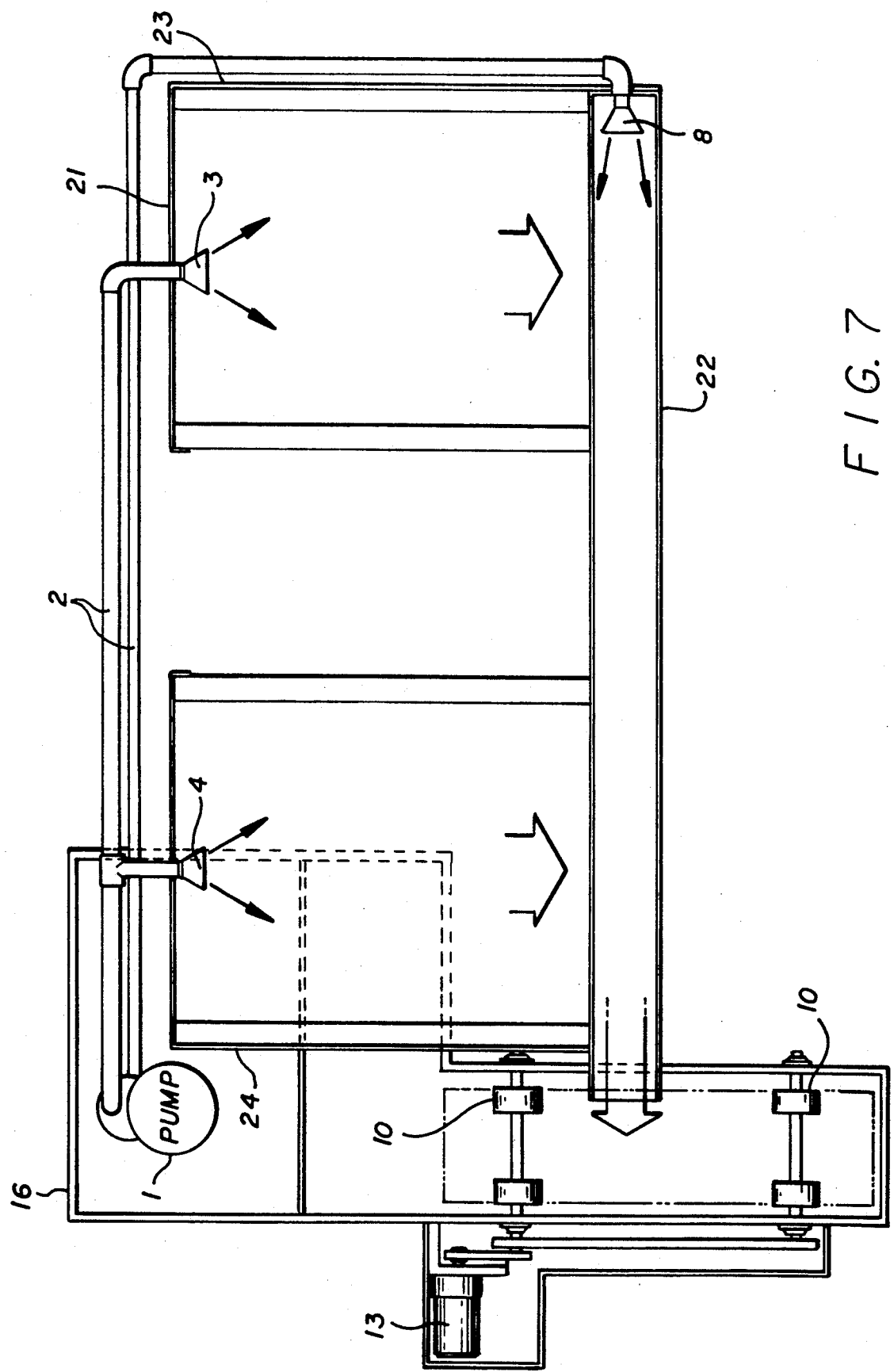
FIG. 7 is a top view of the embodiment of FIG. 1.

As shown in FIGS. 3 and 7, adjustable spray nozzles 3 and 4 are provided in the first side 21 of the housing 18 positioned at the respective ends of cuttings trays 5 and 6. An adjustable spray nozzle 8 is provided in the third side 23 of the housing 18 positioned at an end of cross-tray 7. Spray nozzles 3, 4 and 8 are connected by pipes 2 to electric pump 1 so as to receive coolant from steel coolant tank 16.

As shown in FIG. 3, rotating drum 9 is positioned outside and adjacent to the fourth side 24 of the housing 18 for collecting the cuttings from the cross-tray 7. The rotating drum 9 is positioned above a portion of the coolant tank 16. The rotating drum has a perforated surface 17 and a hollow annular structure with fins 11 disposed in an axial direction along its interior. As shown in FIG. 5, the fins are generally concave in shape so as to scoop the cuttings in the direction of rotation of the drum.

Referring back to FIG. 3, the rotating drum 9 sits on rollers 10 which are driven by a belt 14 connected to an electric motor 13, so as to rotate rotating drum 9. In an alternative embodiment of the present invention, rollers 10 can be rotated directly by electric motor 13 without the aid of a belt.

Figure 6:
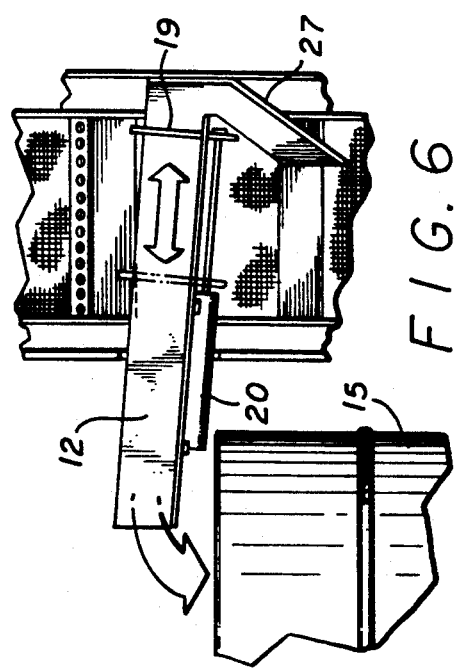
FIG. 6 is a sectional view of the drop tray taken through line 6—6 of FIG. 5.

A drop tray 12 is positioned along a horizontal chord of rotating drum 9 and is angled at an incline sloping upward in a direction away from the housing 18. As shown in FIG. 6, a blade 19 is disposed transverse to the longitudinal direction of drop tray 12. Blade 19 is powered by pneumatic cylinder 20 so as to move up and down drop tray 12 in the longitudinal direction. Moreover, a return chute 27 adjoins the lower edge of drop tray 12 for directing coolant and stray cuttings that fall down drop tray 12 back into drum 9.

A collection drum 15 is positioned below the lower end of the drop tray 12.

The operation of the preferred embodiment will now be described. As discussed above, the machine tool 25 is positioned above the cuttings trays 5 and 6. Cuttings from the material being machined land onto the cutting trays 5 and 6. The electric pump 1 pumps coolant from coolant tank 16 through pipes 2 to nozzles 3, 4 and 8. As shown in FIG. 7, coolant is expelled out of nozzles 3 and 4 at a high pressure, forcing the cuttings into cross-tray 7. The cuttings in cross-tray 7 are in turn forced by a coolant jet from nozzle 8 down cross-tray 7 and into rotating drum 9.

As illustrated in FIG. 5, perforations 17 allow the coolant to drain off the cuttings and return back to the coolant tank 16. As drum 9 rotates, the fins 11 hold the cuttings until gravity causes the cuttings to fall off the fins 11 and onto drop tray 12. The cuttings then are pushed off drop tray 12 by blade 19 into collection drum 15.

Because drop tray 12 is angled, coolant drains off the cuttings while being pushed forward by blade 19. The coolant and small stray cuttings that were not initially caught by blade 19 move down drop tray 12 and fall through return chute 27 back into drum 9. The coolant then drains through the perforated surface 17 of the drum and is recycled to the tank, while the stray cuttings are carried back to drop tray 12 by drum 9. The angled drop tray thereby provides an additional means for achieving superior separation of the coolant from the cuttings.

What is claimed is:

1. An apparatus for the hydraulic removal and collection of cuttings from a machine tool, said apparatus comprising:

a housing at least partially enclosing said machine tool;

a plurality of collection trays at a bottom of said housing for collecting cuttings as they fall from said machine tool;

a rotating drum for collecting said cuttings from said collection trays, said drum having a hollow annular structure with fins disposed in an axial direction along an interior of said drum for carrying said cuttings in a circumferential direction as said drum rotates;

a plurality of hydraulic nozzles in said housing for directing flow of a fluid so as to force said cuttings in said collection trays into said drum;

pump means for pumping said fluid to said hydraulic nozzles; and a drop tray extending through the interior of said drum, whereby said cuttings fall from said interior of said drum onto said drop tray.

2. The apparatus of claim 1, wherein said collection trays comprise:

a plurality of cuttings trays at the bottom of said housing, said cuttings trays oriented in a direction from a first side of said housing to a second side of said housing, said second side positioned substantially parallel to said first side; and a cross-tray at the bottom of said housing running along said second side transverse to said cuttings trays, and oriented in a direction from a third side of said housing to a fourth side of said housing, said fourth side positioned substantially parallel to said third side, said third and fourth sides being substantially perpendicular to said first and said second sides, wherein said cross-tray exits said housing through an opening in said fourth side.

3. The apparatus of claim 2, wherein:
said cuttings trays are angled at an incline sloping downward in a direction from said first side of said housing to said second side of said housing, and
said cross-tray is positioned at a height lower than said cuttings trays.

4. The apparatus of claim 2, wherein said hydraulic nozzles comprise:
a plurality of first side hydraulic nozzles in said first side of said housing positioned at an end of said cuttings trays for directing flow of said fluid so as to force said cuttings in said cuttings trays to move across said cuttings trays into said cross-tray; and
a plurality of third side hydraulic nozzles in said third side of said housing positioned at an end of said cross-tray for directing flow of said fluid so as to force said cuttings in said cross-tray to move across said cross-tray into said drum.

5. The apparatus of claim 1, further comprising:
a tank for storing said fluid; and
pipes connecting said pump means to said hydraulic nozzles so as to supply said fluid from said tank to said hydraulic nozzles.

6. The apparatus of claim 5, wherein said rotating drum is positioned above a portion of said tank and said drum has a perforated surface so as to allow said fluid to drain off of said cuttings back into said tank.

7. The apparatus of claim 1, wherein said drum rests upon a plurality of rolling means for rotating said drum.

8. The apparatus of claim 1, wherein said fins are generally concave in shape so as to scoop said cuttings in the direction of rotation of said drum.

9. The apparatus of claim 1, wherein said drop tray has a bottom edge and a top edge, said bottom edge is positioned along a horizontal chord of said drum, and said drop tray is angled at an incline sloping upward from said bottom edge in a direction away from said housing towards said top edge.

10. The apparatus of claim 9, wherein a return chute adjoins the bottom edge of said drop tray for directing coolant and cuttings falling down said drop tray back into said drum.

11. The apparatus of claim 1, further comprising a pushing means for pushing said cuttings off of said drop tray.

12. The apparatus of claim 11, wherein said pushing means comprises a blade disposed transverse to a longitudinal direction of said drop tray, said blade being driven back and forth with respect to said longitudinal direction by a pneumatic cylinder attached to a bottom of said drop tray, whereby said blade pushes said cuttings off of said drop tray.

13. The apparatus of claim 1, wherein said fluid is a coolant for cooling said machine tool.

14. An apparatus for the hydraulic removal and collection of cuttings from a machine tool, said apparatus comprising:
a housing at least partially enclosing said machine tool;
a tank for storing fluid;
a plurality of cuttings trays at a bottom of said housing, said cuttings trays angled at an incline sloping downward in a direction from a first side of said housing to a second side of said housing, said second side positioned substantially parallel to said first side;
a cross-tray at the bottom of said housing running along said second side transverse to said cuttings trays, at a height lower than said cuttings trays, and oriented in a direction from a third side of said housing to a fourth side of said housing, said fourth side positioned substantially parallel to said third side, said third and fourth sides being substantially perpendicular to said first and second sides, wherein said cross-tray exits said housing through an opening in said fourth side;
a rotating drum outside and adjacent to said fourth side of said housing for collecting said cuttings from said cross-tray, said drum positioned above a portion of said tank and having a hollow annular structure with fins disposed in an axial direction along an interior of said drum for carrying said cuttings in a circumferential direction as said drum rotates, wherein said fins are generally concave in shape so as to scoop said cuttings in the direction of rotation of said drum, said drum further having a perforated surface for allowing drainage of said fluid back into said tank, wherein said drum rotates around an axis parallel to said cross-tray;
a plurality of rolling means, upon which rests said drum, for rotating said drum around an axis parallel to said cross-tray;
motor means for driving at least one of said rolling means;
a plurality of first side hydraulic nozzles in said first side positioned at an end of said cuttings trays for directing flow of said fluid so as to force said cuttings in said cuttings trays to move down said cuttings trays into said cross-tray;
a plurality of third side hydraulic nozzles in said third side positioned at an end of said cross-tray for directing flow of said fluid so as to force said cuttings in said cross-tray to move across said cross-tray into said drum, said first and third side hydraulic nozzles being connected by pipes to said pump means so as to receive said fluid from said tank;
pump means for pumping said fluid from said tank to said first and third side hydraulic nozzles;
a drop tray having a bottom edge and a top edge, said bottom edge positioned in a horizontal plane along a chord of said rotating drum, said drop tray angled at an incline sloping upward from said bottom edge in a longitudinal direction away from said housing towards said top edge, whereby said cuttings fall from said interior of said drum onto said drop tray;
a return chute adjoining the bottom edge of said drop tray for directing coolant and cuttings falling down said drop tray back into said drum; and
pushing means for pushing said cuttings off of said drop tray.

15. The apparatus of claim 14, wherein said pushing means comprises a blade disposed transverse to said longitudinal direction of said drop tray, said blade being driven back and forth with respect to said longitudinal direction by a pneumatic cylinder attached to a bottom of said drop tray, whereby said blade pushes said cuttings off of said drop tray.

16. The apparatus of claim 14, wherein said fluid is a coolant for cooling said machine tool.

17. A method for hydraulically removing and collecting cuttings from a machine tool, wherein said cuttings fall from said machine tool onto collection trays, said method comprising the steps of:

pumping a fluid across said collection trays so as to force said cuttings into a drum having a hollow annular structure with fins disposed in an axial direction along an interior of said drum, said drum further having a perforated surface; and rotating said drum so as to allow said fluid to drain off of said cuttings through said perforated surface and to allow said fins to carry said cuttings in the direction of rotation until gravity forces said cuttings to fall onto a drop tray.

18. The method of claim 17 further comprising the step of automatically pushing said cuttings off of said drop tray with a blade that is pneumatically driven back and forth with respect to a longitudinal direction of said drop tray.

19. The method of claim 17, wherein said fluid is a coolant for cooling said machine tool.

20. A method for hydraulically removing and collecting cuttings from a machine tool, wherein said cuttings fall from said machine tool onto cuttings trays, said method comprising the steps of:

pumping a fluid across said cuttings trays so as to force said cuttings into a cross-tray running perpendicular to a direction of flow of said cuttings in said cuttings trays;

pumping said fluid across said cross-tray so as to force said cuttings in said cross-tray into a drum having a hollow annular structure with fins disposed in an axial direction along an interior of said drum, said drum further having a perforated surface;

rotating said drum so as to allow said fluid to drain off of said cuttings through said perforated surface and to allow said cuttings to be carried by said fins in the direction of rotation of said drum until gravity causes said cuttings to fall onto a drop tray.

21. The method of claim 20 further comprising the step of automatically pushing said cuttings off of said drop tray with a blade that is pneumatically driven back and forth with respect to a longitudinal direction of said drop tray.

22. The method of claim 20, wherein said fluid is a coolant for cooling said machine tool.

23. A rotating drum for collecting cuttings and recovering a fluid in a hydraulic cuttings removal and collection system for machine tools, said drum comprising:

a hollow annular structure having a perforated surface, said perforated surface having perforations of a predetermined size enabling said drum to retain cuttings larger than said predetermined size, while enabling said fluid to drain off of said cuttings through said perforated surface for recycling;

cuttings supply means for introducing machine tool cuttings into said hollow annular structure by a flow of said fluid; and a plurality of fins disposed in an axial direction along an interior of said drum for carrying said larger cuttings in a circumferential direction as said drum rotates, said fins carrying said larger cuttings in a circumferential direction as said drum rotates until gravity forces said cuttings to fall onto a drop tray for collection.

24. The rotating drum of claim 23, wherein said fins are generally concave in shape so as to scoop said larger cuttings in the direction of rotation of said drum.

25. An apparatus for the hydraulic removal and collection of cuttings from a machine tool, said apparatus comprising:

a housing at least partially enclosing said machine tool;

a plurality of collection trays at a bottom of said housing for collecting cuttings as they fall from said machine tool, wherein at least one of said collection trays exits said housing through an opening in said housing;

a plurality of hydraulic nozzles in said housing for directing flow of a fluid so as to force said cuttings in said collection trays out of said opening; and separation means disposed adjacent to said opening for receiving said cuttings forced out by said flow of fluid and for separating the cuttings from the fluid.

26. The apparatus of claim 25, further comprising a collection means positioned outside of said housing and adjacent to said opening for collecting said cuttings from said separation means.

* * * * *